United States Patent
Jankovic (10) Patent No.: US 9,670,854 B2
(45) Date of Patent: Jun. 6, 2017

(54) METHOD AND SYSTEM FOR AIR CHARGE ESTIMATION

(71) Applicant: Ford Global Technologies, LLC, Dearborn, MI (US)

(72) Inventor: Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 14/875,249

(22) Filed: Oct. 5, 2015

(65) Prior Publication Data

US 2016/0146139 A1 May 26, 2016

Related U.S. Application Data

(60) Provisional application No. 62/082,311, filed on Nov. 20, 2014.

(51) Int. Cl.

| | |
|---|---|
| *G06F 19/00* | (2011.01) |
| *F02D 41/00* | (2006.01) |
| *F02D 41/30* | (2006.01) |
| *F02B 75/02* | (2006.01) |
| *F02D 41/18* | (2006.01) |
| *F02D 13/06* | (2006.01) |

(52) U.S. Cl.
CPC ......... *F02D 41/0087* (2013.01); *F02B 75/02* (2013.01); *F02D 13/06* (2013.01); *F02D 41/0007* (2013.01); *F02D 41/18* (2013.01); *F02D 41/3094* (2013.01); *F02B 2075/027* (2013.01); *F02D 2041/0012* (2013.01); *F02D 2200/0402* (2013.01); *F02D 2200/0406* (2013.01); *Y02T 10/144* (2013.01); *Y02T 10/18* (2013.01)

(58) Field of Classification Search
CPC ............. F02B 19/1052; F02D 2700/02; F02D 41/0002; F02D 19/081; Y02T 10/42
USPC ......... 701/101, 103, 110–114; 123/564, 434, 123/673, 679, 687
See application file for complete search history.

(56) References Cited

U.S. PATENT DOCUMENTS

| | | | |
|---|---|---|---|
| 8,651,091 B2 | 2/2014 | Tripathi et al. | |
| 2006/0254537 A1* | 11/2006 | Lewis | ..................... F01L 9/04 123/21 |
| 2013/0245921 A1* | 9/2013 | Glugla | ................ F02D 41/0085 701/105 |
| 2014/0041625 A1* | 2/2014 | Pirjaberi | ................. F02D 41/00 123/349 |
| 2016/0040614 A1* | 2/2016 | Younkins | ............... F02D 41/266 123/335 |
| 2016/0131058 A1* | 5/2016 | Younkins | ............ F02D 41/0087 123/334 |

* cited by examiner

*Primary Examiner* — John Kwon
(74) *Attorney, Agent, or Firm* — Julia Voutyras; McCoy Russell LLP (57) ABSTRACT

Systems and methods are provided. In one example, a method for an engine comprises adjusting an air charge estimate for a first cylinder based on a firing pattern of a second cylinder. In this way, cylinder air charge estimates may be improved in real-time for an arbitrary cylinder firing pattern, thereby improving engine efficiency.

20 Claims, 4 Drawing Sheets

METHOD AND SYSTEM FOR AIR CHARGE ESTIMATION

CROSS REFERENCE TO RELATED APPLICATIONS

The present application claims priority to U.S. Provisional Patent Application No. 62/082,311, entitled "Method and System for Air Charge Estimation," filed on Nov. 20, 2014, the entire contents of which are hereby incorporated by reference for all purposes.

FIELD

The present application relates to methods and systems for determining the air charge within the cylinders of an engine system configured to perform selective cylinder non-fueling operation repeatedly over numerous engine cycles.

BACKGROUND AND SUMMARY

Engines may be configured to operate with a variable number of active or deactivated cylinders to increase fuel economy, while optionally maintaining the overall exhaust mixture air-fuel ratio about stoichiometry. Such engines are known as variable displacement engines (VDE). Therein, a portion of an engine's cylinders may be disabled during selected conditions defined by parameters such as a speed/load window, as well as various other operating conditions including vehicle speed. A VDE control system may disable a selected group of cylinders, such as a bank of cylinders, through the control of a plurality of cylinder valve deactivators that affect the operation of the cylinder's intake and exhaust valves, or through the control of a plurality of selectively deactivatable fuel injectors that affect cylinder fueling.

Further improvements in fuel economy can be achieved in engines configured to vary the effective displacement of the engine by stopping the delivery of fuel to certain selected cylinders in an indexed cylinder firing pattern. One example of selective cylinder non-fueling is shown by Tripathi et al. in U.S. Pat. No. 8,651,091. Therein, an engine fuel controller may continuously rotate which particular cylinders are fueled, which cylinders are not fueled, and how many cylinder events and/or engine cycles for which the pattern is continued. In addition, optionally individual valve mechanisms of each cylinder not fueled may be selectively deactivated, or maintained operating so that the cylinders pump unfueled cylinder charge to the exhaust. By avoiding fuel delivery to selected cylinders, the active cylinders with fuel delivery can be operated nearer a desired efficiency, increasing the overall operating efficiency of the engine. By varying the identity and number of cylinders selectively not fueled, a large range of engine displacement options may be possible.

However, the inventors herein have identified a potential issue with such engine systems. In particular, an estimation of cylinder air charge may be difficult to compute due to the numerous firing patterns that an engine controller may run. In systems, such as two-position VDE engine systems with, for example, four-cylinder and eight-cylinder modes, two sets of look-up tables may be generated based on measured data from the two modes. Each set of look-up tables may be used when the engine is operating in the respective mode.

For selective non-fueling operation, however, the wide variety of modes available would necessitate an equal number of look-up tables, which may results in over-complexity such that it is not ever possible to have overall accurate estimation of cylinder air charge. An accurate estimation of cylinder air charge is useful in determining appropriate fuel injection amounts, spark timing, torque estimates, and so on. Furthermore, cylinder air charge estimates may be used to estimate and schedule many other variables, such as air-fuel ratio. As a result, inaccurate cylinder air charge estimates may result in a degraded efficiency of engine operation and may adversely affect emission control.

In one example, some of the issues above may be addressed by a method for an engine that comprises adjusting an air charge estimate for a first cylinder based on a firing pattern of another, second, cylinder. In this way, cylinder air charge estimates may be improved in real-time for an arbitrary cylinder firing pattern, thereby improving engine efficiency during selective cylinder non-fueling/firing operation.

In another example, a method for an engine comprises adjusting an air charge estimate for a first cylinder by a first amount responsive to a second cylinder not firing during a current cycle or a previous cycle, adjusting the air charge estimate by a second amount responsive to the second cylinder firing during the current cycle and not firing during the previous cycle, adjusting the air charge estimate by a third amount responsive to the second cylinder not firing in the current cycle and firing during the previous cycle, and not adjusting the air charge estimate otherwise. In this way, cylinder air charge estimates may be improved, which in turn may improve fuel economy and emission control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
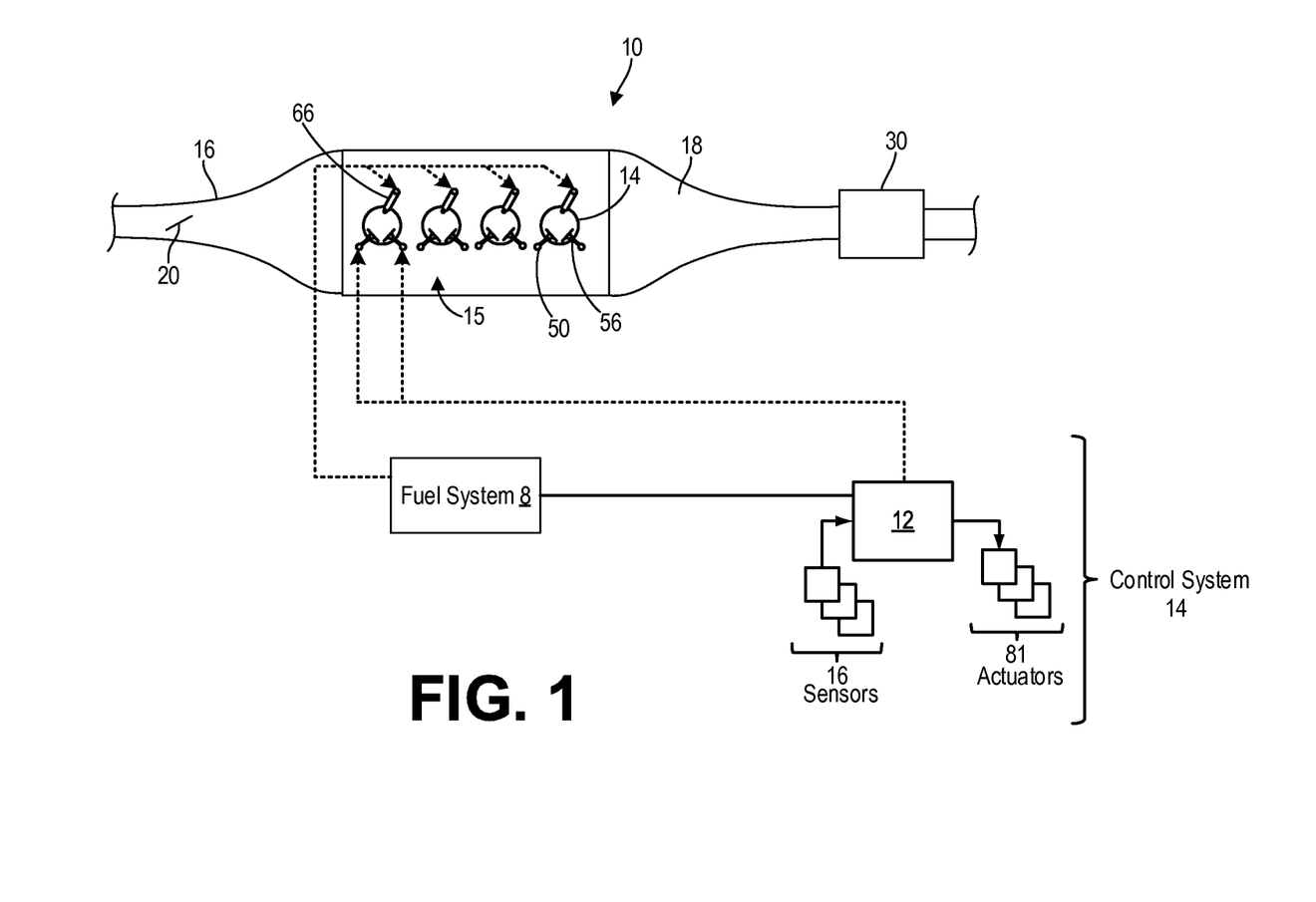
FIG. 1 shows an example embodiment of an engine system layout.
Figure 2:
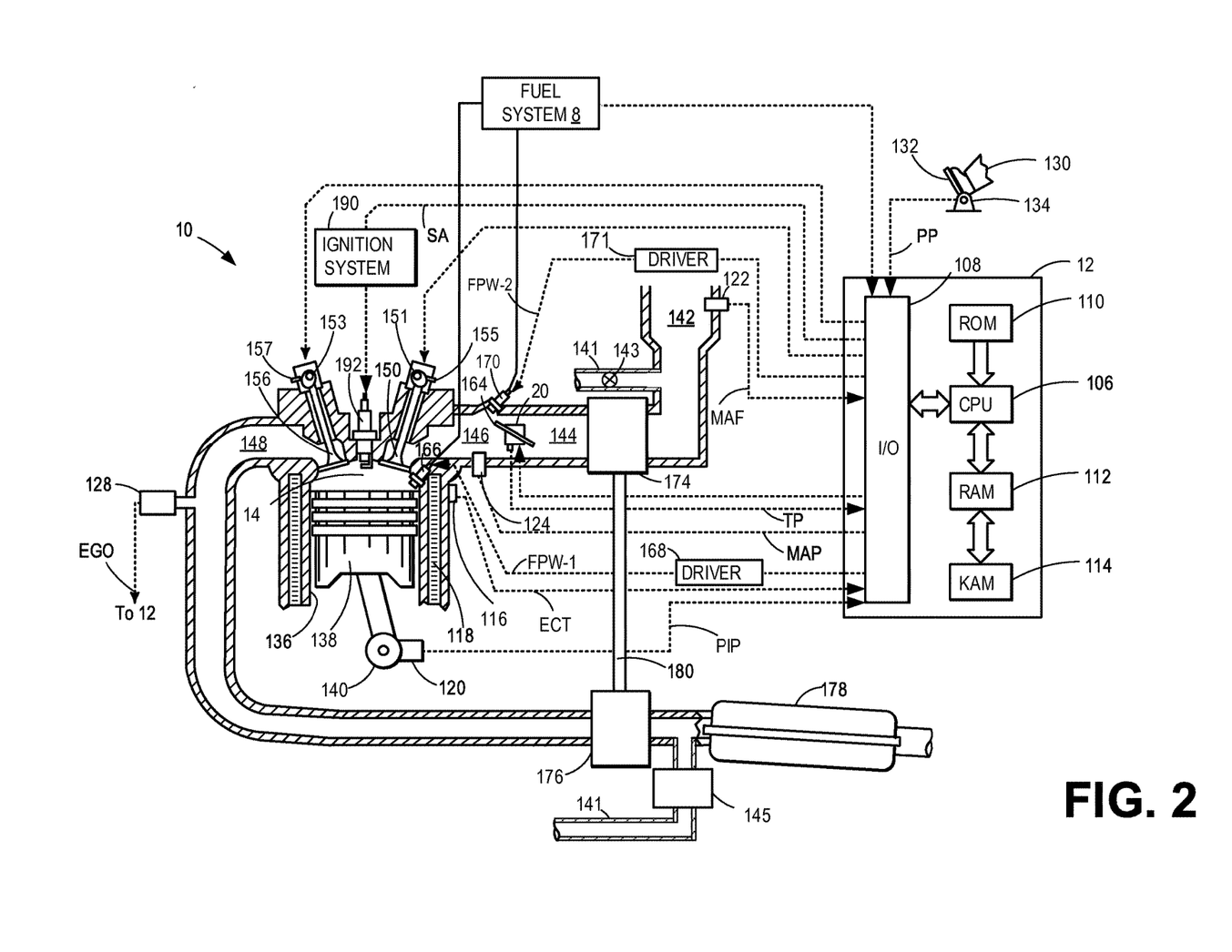
FIG. 2 shows a partial engine view.
Figure 3:
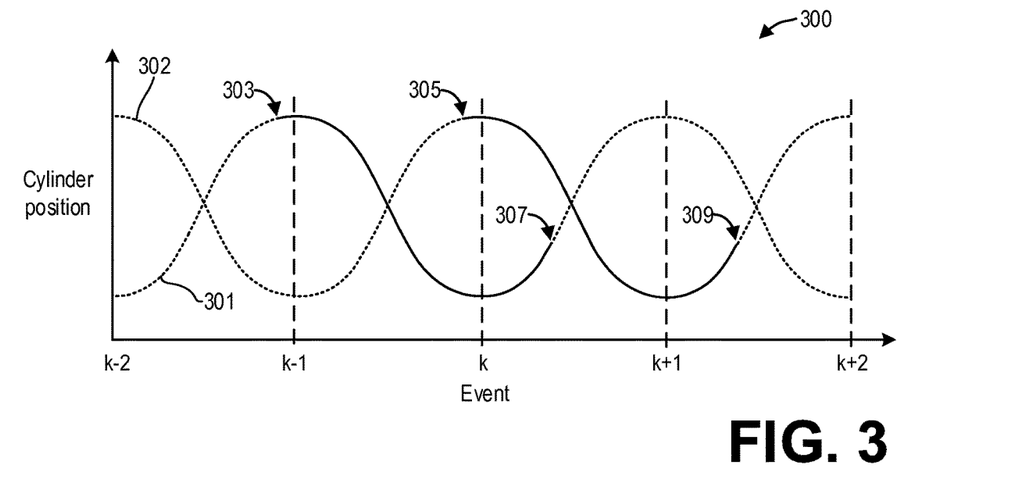
FIG. 3 shows a graph illustrating an example sequence of intake events for two cylinders in an inline-four engine configuration.
Figure 4:
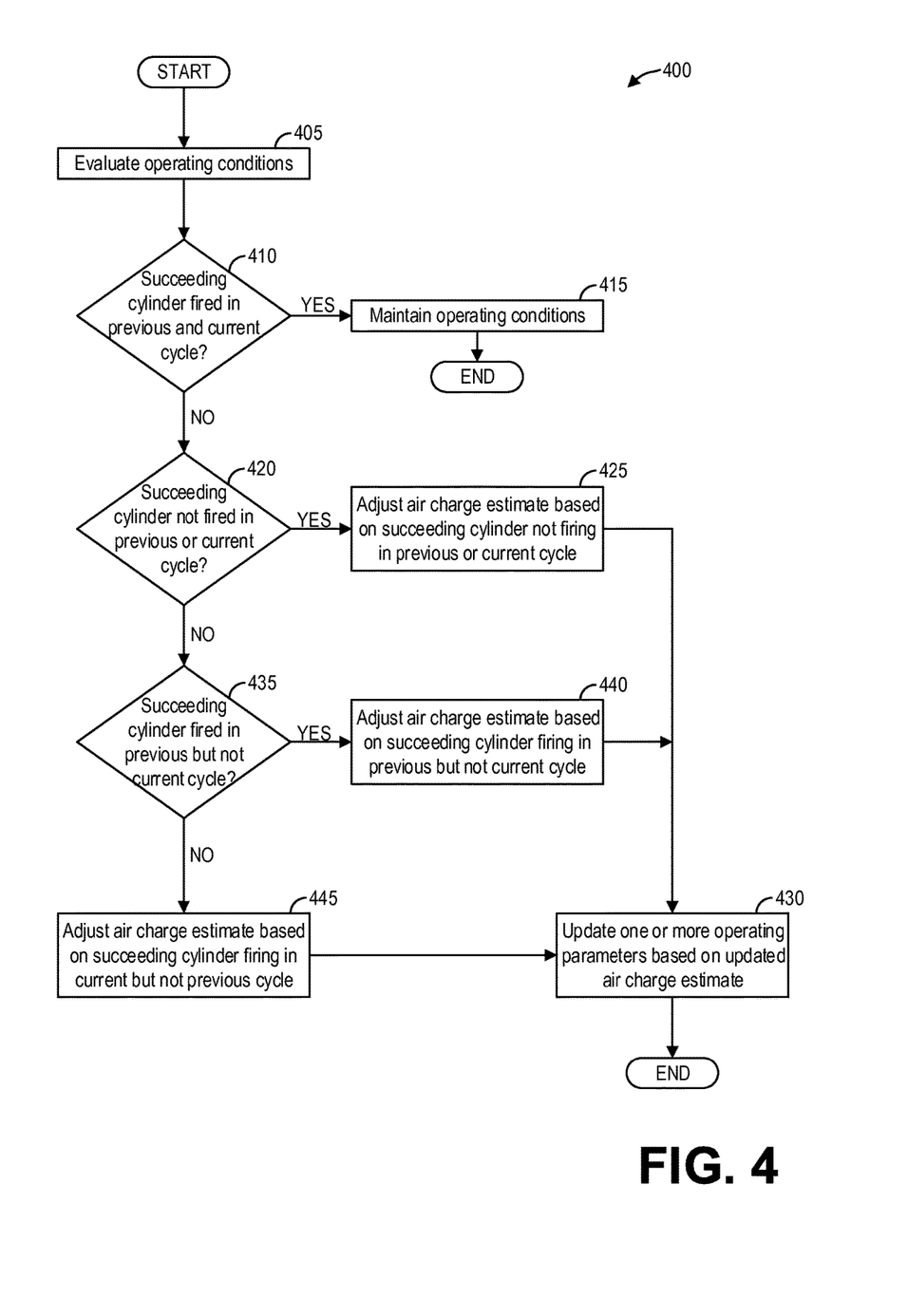
FIG. 4 shows a high-level flow chart for adjusting air charge estimates based on non-fueling cylinder operation.

Methods and systems are provided for adjusting an air charge estimate for a given cylinder when operating an engine configured for selective cylinder deactivation through selective fueling and non-fueling of the engine cylinders, such as the engine system of FIGS. 1 and 2. An engine controller may adjust an air charge estimate for a given cylinder based on the combustion or non-combustion of a second cylinder, where the stroke cycle of the second cylinder is 180 degrees behind the stroke cycle of the given cylinder as shown in FIG. 3. As shown in FIG. 4, the air charge estimate may be adjusted based on whether or not the second cylinder combusted in a previous cycle and a current cycle for the given cylinder.

FIG. 1 shows an example engine 10 having a cylinder bank 15. In the depicted example, engine 10 is an inline-four (I4) engine with the cylinder bank having four cylinders 14. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine system 10 may have cylinders 14 with selectively deactivatable intake valves 50 and selectively deactivatable exhaust valves 56. In one example, intake valves 50 and exhaust valves 56 are configured for electric valve actuation (EVA) via electric individual cylinder valve actuators. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on the cylinder bank 15. The number and identity of cylinders deactivated on the cylinder bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow and spark to the deactivated cylinders may be stopped, such as by deactivating cylinder fuel injectors.

In some examples, engine system 10 may have selectively deactivatable (direct) fuel injectors and the selected cylinders may be deactivated by shutting off the respective fuel injectors while maintaining operation of the intake and exhaust valves such that air may continue to be pumped through the cylinders.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific firing (and/or non-firing) pattern based on a designated control algorithm. More specifically, selected deactivated working cylinders are not fired while other active working cylinders are fired. The overall pattern may be defined for one cycle of the engine, where for an example of a four-cylinder engine with cylinders having positional numbers 1-4 (with 1 at one end of the line and 4 at the other end of the line) and a firing order of 1-3-4-2 has a pattern of 1-x-4-x, where an "x" represents non-fueling (or deactivation) and the number means that that cylinder is fueled and fired. Another, different pattern may be x-3-x-2. Still other patterns may be 1-x-x-4, and x-3-4-x, and 1-3-4-x, and 1-x-4-2, and so on. Even if each of these patterns is operated at the same overall airflow, the cylinder charge for a given cylinder can depend on the order, and in particular whether the cylinders immediately preceding and immediately following, are firing or non-firing. As such, for the example of patterns 1-3-4-2, x-3-4-2, 1-3-x-2, and x-3-x-2, cylinder 3's air charge may have a different adjustment factor for each pattern, even at the same overall airflow through the engine. However, rather than simply using different factors for every single combination and every cylinder at every airflow value, the inventors herein have recognized that these exceeding large number of options can be reduced to a more manageable group of adjustments based on whether another cylinder in the firing order (e.g., immediately preceding or following) fired or not. Additional details and operations will be provided below herein. In one example the firing order is fixed by a crankshaft and camshaft of the engine via mechanical connection through a timing chain or belt. While the firing pattern may change in such a configuration, the firing order does not.

Returning to FIG. 1, the engine may utilize spark timing adjustments. Optionally, a spark timing associated with a selected firing of a selected working chamber may also be adjusted based on a firing order or firing history of the selected working chamber. The engine controller 12 may be configured with suitable logic, as described below, for determining a cylinder deactivation pattern based on engine operating conditions.

Engine 10 may operate on a plurality of substances, which may be delivered via fuel system 8. Engine 10 may be controlled at least partially by a control system including controller 12. Controller 12 may receive various signals from sensors 16 coupled to engine 10 (and described with reference to FIG. 2), and send control signals to various actuators 81 coupled to the engine and/or vehicle (as described with reference to FIG. 2). The actuators may include motors, solenoids, etc., coupled to engine actuators, such as an intake throttle, fuel injector, etc. The various sensors may include, for example, various temperature, pressure, and air-fuel ratio sensors. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in cylinder pressure transducers.

Engine controller 12 may include a drive pulse generator and a sequencer for determining a cylinder pattern based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/non-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder patter, the individual cylinder valve mechanisms of the selected cylinders may be closed while fuel flow and spark to the cylinders are stopped.

Since optimal efficiency for a given cylinder is near full output, a lower frequency of firing events may be chosen to reduce output. For example, selectively not fueling every other cylinder would produce half of the power, on average. Spacing the firing events out as evenly as possible tends to minimize vibrations due to the varying torque output. Whether all of the cylinders are included as being deactivated in the selected firing pattern may depend on the fraction of output desired, and other considerations including cylinder temperature.

In this way, by adjusting the cylinder pattern of individual cylinder valve mechanisms and individual cylinder fuel injectors, a desired engine output can be provided by operating fewer cylinders more efficiently, thereby improving fuel economy.

Controller 12 may further adjust an air charge estimate of a given cylinder based on the selective non-firing of a succeeding cylinder during a previous and/or a current combustion cycle. A method for adjusting an air charge estimate for a given cylinder is described further herein and with regard to FIG. 4.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injector hole than the other. Other differences include, but are not limited to, different spray angles, different operating temperatures, different targeting, different injection timing, different spray characteristics, different locations, etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more of pressure, temperature, and concentration of the exhaust gas.

Controller 12 is shown in FIG. 1 as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

In this way, the system of FIGS. 1 and 2 enables a method for an engine comprising adjusting an air charge estimate for a first cylinder based on a firing pattern of a second cylinder.

In another example, a method for an engine comprises adjusting an air charge estimate for a first cylinder by a first amount responsive to a second cylinder not firing during a current cycle or a previous cycle, adjusting the air charge estimate by a second amount responsive to the second cylinder firing during the current cycle and not firing during the previous cycle, adjusting the air charge estimate by a third amount responsive to the second cylinder not firing in the current cycle and firing during the previous cycle, and not adjusting the air charge estimate otherwise.

FIG. 3 shows a graph 300 illustrating an example sequence of intake events for two cylinders. In particular, graph 300 includes plots 301 and 302 which depict the cylinder position for a first cylinder and a second cylinder, respectively, during a four-stroke cycle, wherein the first cylinder and the second cylinder are 180 degrees out of phase with regard to the cycle. The solid portions of plots 301 and 302 depict a duration wherein the corresponding intake valve for each cylinder is open, while the dashed portions of plots 301 and 302 depict a duration wherein the corresponding intake valve for each cylinder is closed.

Between events k−2 and k−1, the first cylinder represented by plot 301 undergoes an exhaust stroke while the second cylinder represented by plot 302 undergoes an expansion stroke. Between events k−1 and k, the first cylinder undergoes an intake stroke while the second cylinder undergoes an exhaust stroke. Between events k and k+1, the first cylinder undergoes a compression stroke while the second cylinder undergoes an intake stroke. Between events k+1 and k+2, the first cylinder undergoes an expansion stroke while the second cylinder undergoes a compression stroke.

For normal cylinder ignition with no non-fueling, the first cylinder may undergo ignition at event k+1 while the second cylinder may undergo ignition at event k+2. In this way, the second cylinder is behind, or succeeds, the first cylinder by 180 degrees. Furthermore, during normal cylinder ignition with no deactivation, the second cylinder may undergo ignition at event k−2.

An intake valve opening (IVO) 303 occurs for the first cylinder prior to event k−1, while an IVO 305 occurs for the second cylinder prior to event k. An intake valve closing (IVC) 307 occurs for the first cylinder after event k, while an IVC 309 occurs for the second cylinder after event k+1. Therefore, the intake valves for both cylinders are simultaneously open between the IVO 305 and IVC 307 events. In this way, the firing or non-firing of the second cylinder may affect the air charge within the first cylinder, as described further herein.

The sequence of IVO and IVC events as described above may impact the air charge estimate for a particular cylinder. For example, the amount of residual gas trapped in a cylinder during an intake stroke depends on the events close to the IVO of the cylinder. Any residual gas that remains trapped in the cylinder displaces air and therefore reduces volumetric efficiency of the cylinder, or the amount of air charge in the cylinder. If the exhaust pressure is higher than the intake pressure during the valve overlap period, the backflow of exhaust gas from the exhaust into the intake port may result in an increased amount of residual gas in the cylinder (where the overlap may include positive valve overlap between an intake and exhaust valve of the cylinder at the end of exhaust and beginning of intake at top-dead-center). As a result, volumetric efficiency and the amount of air charge may be reduced. Conversely, if the intake pressure is higher than the exhaust during the valve overlap, fresh air flows into the exhaust, thereby clearing any residual gas and increasing volumetric efficiency and the amount of air charge.

As one example, with a cylinder having four cylinders firing in the firing order of 1-3-4-2, as illustrated in FIG. 3, one can see that IVO of cylinder 1 occurs just before the BDC of cylinder 3 expansion and, hence, close to the blow-down pulse of cylinder 3 into the exhaust manifold. The amount of trapped air may also depend on the intake manifold pressure close to the intake valve closing (IVC)—this has a larger effect at lower engine speeds and a smaller effect at higher engine speeds. Thus, if the cylinder 3 has not fired in the previous cycle, there will be no blow-down pulse, and the exhaust pressure during overlap will be noticeably lower. This reduces backflow and increases chances of scavenging. Either way, the trapped residual will be lower and the air-charge higher. If cylinder 3 is not going to fire in the current cycle, then there will be no intake in this cylinder, making the pressure at IVC higher than it would be otherwise. This would be more pronounced in cylinder valve timing with a late IVC (e.g., past bottom-dead-center) operation.

The same relationship exists between cylinders 4 and 2, and then symmetrically 2 and 1, and 3 and 4. Thus, in one example, for each cylinder of the engine cycle, an adjustment to its cylinder air charge is made based on the firing or non-firing of the immediately subsequent cylinder in the firing order both in the immediately preceding engine cycle and in the current engine cycle.

In one example, a mapped value may be used to address the average impact of the above described mechanisms on air charge—that is, (A) when the succeeding cylinder did not fire in the previous cycle but will fire in the current and (B) did fire in the previous cycle will not fire in the current. To separate the two effects, the engine could be run with cylinders 3 and 2 alternatively firing and non-firing. Then by looking at the change in ISFC and/or air-fuel ratio between non-fired and fired cycles, one may determine the impact and the needed adjustment of each mechanism on cylinders 1 and 4. The adjustment for cylinders 3 and 2 can be obtained by alternatively firing and skipping cylinders 1 and 4.

If the two mechanisms are separated in the controller, it may adjust other engine control variables such as spark timing. The air-charge difference determined for situation A may be assigned to the different trapped residual, whereas the difference determined for situation B may be assigned to a change only in the mass of trapped air. In either case, the different situations may be used to differentially adjust spark timing to account for the changes in burn rate.

Referring again to FIG. 3, the IVO 303 of the first cylinder occurs just before the second cylinder reaches bottom dead center (BDC) of the expansion stroke, and hence, close to a blow-down pulse of the second cylinder into the exhaust manifold, or the opening of the exhaust valve for the second cylinder. If the second cylinder did not fire in the previous cycle (i.e., the cycle immediately preceding the current cycle), there will not be a blow-down pulse for the second cylinder, and so the exhaust manifold pressure during valve overlap for the first cylinder may be substantially lower. As a result, the chances of backflow are reduced and the chances of scavenging are increased. In this way, the residual gas trapped in the first cylinder may be lower and the air charge for the first cylinder may be higher compared to normal engine operation. As described further herein with regard to FIG. 4, a method for adjusting an estimate of air charge for a given cylinder, such as the first cylinder, may include determining if a succeeding cylinder, such as the second cylinder, did or did not combust in the previous cycle. For example, if the second cylinder did not fire in the previous cycle, the estimate of air charge in the first cylinder may be increased for at least the reasons described above.

As noted above, the amount of trapped air in a cylinder further depends on the intake manifold pressure close to the IVC of the cylinder. In some examples, such dependence of the amount of trapped air on intake manifold pressure close to IVC is increased at lower engine speeds compared to higher engine speeds. If the second cylinder is not going to fire in the current cycle, then there may be no intake in the second cylinder as the intake valve for the second cylinder is maintained closed. As a result, the intake manifold pressure at IVC for the first cylinder is higher than the pressure would be otherwise. In some examples where IVC occurs late, such as Atkinson or Miller cycle engines, the intake manifold pressure may be substantially increased if the second cylinder is not going to fire in the current cycle, thereby increasing the air charge in the first cylinder. As described further herein with regard to FIG. 4, a method for adjusting an estimate of air charge for a given cylinder, such as the first cylinder, may include determining if a succeeding cylinder, such as the second cylinder, will or will not combust in a current cycle. For example, if the second cylinder is not going to fire in the current cycle, the estimate of air charge in the first cylinder may be increased to account for the increased intake manifold pressure.

In some embodiments, an engine controller such as controller 12 may include instructions stored in non-transitory memory to determine an amount of air charge for adjusting an air charge estimate for a cylinder. As a non-limiting illustrative example, consider an inline-four engine configuration. Referring to the first, second, third, and fourth cylinders as 1, 2, 3, and 4, respectively, a conventional firing order may be 1342. Thus, when the first cylinder is firing, the third cylinder succeeds the first cylinder by 180 degrees as discussed above. Similarly, the first cylinder succeeds the second cylinder, the fourth cylinder succeeds the third cylinder, and the second cylinder succeeds the fourth cylinder. Thus, when calculating an air charge estimate for, say, the first cylinder, the controller 12 may adjust the air charge estimate based on the combustion or non-combustion of the third cylinder during the previous and current combustion cycles, as described below with regard to FIG. 4. In some examples, an amount by which to adjust the air charge estimate for the first cylinder may be stored in a look-up table.

In order to determine the amount by which to adjust the air charge estimate for the first cylinder, controller 12 may command one or more specific cylinder fueling and non-fueling patterns. For example, considering the two mechanisms (succeeding cylinder not firing in the previous or current cycles), controller 12 may map the air charge by running all of the cylinders on and then, separately, commanding the first and fourth cylinders on and the second and third cylinders off. The air charge with all cylinders on comprises a baseline air charge and may be obtained using techniques known in the art. The difference between the air charge with all cylinders on and the second and third cylinders off may be used for adjusting the air charge estimate in the first and fourth cylinders. In particular, the difference may be used for adjusting the air charge estimate in the first cylinder when the third cylinder is off during the previous and the current cycle, and the same difference may be used for adjusting the air charge estimate in the fourth cylinder when the second cylinder is off during the previous and the current cycle. A similar approach may be used to obtain an amount by which to adjust an air charge estimate for the second and third cylinders. For example, controller 12 may command the second and third cylinders off and measure the subsequent change in air charge. The difference may be used for adjusting the air charge estimate in the second cylinder when the first cylinder is off during the previous and current cycles, and similarly for the third cylinder when the fourth cylinder is off during the previous and current cycles.

Controller 12 may further include instructions to determine an amount for adjusting an air charge estimate if a succeeding cylinder did not fire in the previous cycle but will fire in the current cycle, and furthermore if the succeeding cylinder fired in the previous cycle but will not fire in the current cycle. To that end, the second and third cylinders may be alternately fired and not fired (where it would otherwise be fired, such as in its power stroke), and the resultant changes in air-fuel ratio and/or indicated specific fuel consumption (ISFC) may be used to determine an adjustment of air charge estimates for the first and fourth cylinders. Similarly, the first and fourth cylinders may be alternatively fired and not-fired (where it would otherwise be fired, such as in the power stroke) to determine air charge estimate adjustments for the second and third cylinders.

As described further herein with regard to FIG. 4, an air charge estimate for a given cylinder, such as the first cylinder depicted in graph 300, may be adjusted based on the combustion or non-combustion of a succeeding cylinder, such as the second cylinder depicted in graph 300.

FIG. 4 shows a high-level flow chart illustrating an example method 400 for adjusting air charge estimations based on selected cylinder non-fueling cylinder operation. In particular, method 400 relates to adjusting an air charge estimation for a given cylinder based on operation of a cylinder that follows the given cylinder by 180 degrees (hereinafter referred to as a succeeding cylinder). By adjusting the air charge estimation for the given cylinder, one or more engine operating parameters may be updated based on the adjusted air charge estimate, thereby improving fuel economy and emission control. Method 400 will be described with reference to the systems and components depicted in FIGS. 1 and 2, however it should be understood that the method may be applied to other systems and components without departing from the scope of this disclosure. Method 400 may be carried out by controller 12 and may be stored as executable instructions in non-transitory memory.

Method 400 may begin at 405. At 405, method 400 may include evaluating operating conditions. Operating conditions may include, but are not limited to, current cylinder firing patterns, cylinder firing history, mass air flow, engine speed, driver torque command, engine temperature, ambient conditions such as ambient temperature and barometric pressure, boost level, engine load, manifold absolute pressure, and so on. Operating conditions may be measured by one or more sensors coupled to controller 12, or may be estimated or inferred based on available data.

At 410, method 400 may include determining if a succeeding cylinder fired in the previous cycle and will fire in the current cycle. For the given cylinder under consideration, the succeeding cylinder comprises a cylinder that is 180 degrees behind the given cylinder. If the succeeding cylinder fired in the previous cycle and will fire in the current cycle, method 400 may proceed to 415. At 415, method 400 may include maintaining operating conditions. Since the succeeding cylinder fired in the previous cycle and will fire in the current cycle, the operation of the succeeding cylinder does not affect the air charge estimate for the given cylinder. Method 400 may then end.

If the succeeding cylinder did not fire in the previous cycle or did not fire in the current cycle, method 400 may proceed to 420. At 420, method 400 may include determining if the succeeding cylinder did not fire in the previous cycle and will not fire in the current cycle.

If the succeeding cylinder did not fire in the previous cycle and will not fire in the current cycle, method 400 may proceed to 425. At 425, method 400 may include adjusting an air charge estimate for the given cylinder based on the succeeding cylinder not firing in the previous or current cycle. Method 400 may then proceed to 430. At 430, method 400 may include updating one or more operating parameters based on the updated air charge estimate for the given cylinder. Method 400 may then end. The updating may include adjusting a fuel injection amount to the given cylinder based on the updated air charge for the given cylinder. Further, alternatively or in addition, it may include adjusting a spark timing for the given cylinder based on the updated air charge for the given cylinder. Further, alternatively or in addition, it may include adjusting a split ratio between fuel injection between injectors 166 and 170 for the given cylinder.

In this way, the pattern of cylinder firing may affect the split ratio between the injectors. As one example, a pattern with every other cylinder not fired (e.g., 1-x-4-x) may operate with a higher direct injection ratio to port injection ratio (although with both injectors still supplying at least some fuel) than a pattern with asymmetric cylinder disablement (e.g., 1-3-x-2). Still other examples are also possible.

Returning to 420, if the succeeding cylinder is fired in either the previous or current cycle, method 400 may proceed to 435. At 435, method 400 may include determining if the succeeding cylinder fired in the previous cycle but will not fire in the current cycle. If the succeeding cylinder fired in the previous cycle but will not fire in the current cycle, method 400 may proceed to 440, wherein method 400 may include adjusting an air charge estimate for the given cylinder based on the succeeding cylinder firing in the previous but not the current cycle. After adjusting the air charge estimate, method 400 may proceed to 430, wherein method 400 may include updating one or more operating parameters based on the updated air charge estimate. Method 400 may then end.

Returning to 435, if the succeeding cylinder was not fired in the previous cycle and not fired in the current cycle, method 400 may proceed to 445. The succeeding cylinder is not fired in the previous cycle and will fire in the current cycle. Thus at 445, method 400 may include adjusting an air charge estimate for the given cylinder based on the succeeding cylinder firing in the current but not previous cycle. Method 400 may then continue to 430, where one or more operating parameters may be updated based on the updated air charge estimate. Method 400 may then end.

Thus, in one embodiment, a method for an engine comprises: adjusting an air charge estimate for a first cylinder by a first amount responsive to a second cylinder not firing during a current cycle or a previous cycle; adjusting the air charge estimate by a second amount responsive to the second cylinder firing during the current cycle and not firing during the previous cycle; adjusting the air charge estimate by a third amount responsive to the second cylinder not firing in the current cycle and firing during the previous cycle; and not adjusting the air charge estimate otherwise. The method further comprises adjusting an engine operating parameter based on the adjusted air charge estimate. In one example, the engine operating parameter comprises a spark timing. In another example, the engine operating parameter comprises a fuel injection amount.

In another embodiment, a method for an engine comprises adjusting an air charge estimate for a first cylinder based on a firing pattern of a second cylinder. The method further comprises adjusting an engine operating parameter based on the adjusted air charge estimate. In one example, the engine operating parameter comprises a spark timing.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting an air charge estimate for a first cylinder based on an engine firing pattern, including a firing pattern based on firing of a second cylinder.

2. The method of claim 1, further comprising adjusting an engine operating parameter based on the adjusted air charge estimate.

3. The method of claim 2, wherein the engine operating parameter comprises a spark timing.

4. The method of claim 2, wherein the engine operating parameter includes a fuel injection amount.

5. The method of claim 4, further comprising adjusting a ratio of port and direct injection to the first cylinder based on the engine firing pattern.

6. A method for an engine, comprising:
adjusting an air charge estimate for a first cylinder from an engine sensor by a first amount if an immediately following cylinder in an engine cycle fired in its immediately preceding cycle, and by a second amount if the immediately following cylinder is scheduled not to fire in its immediately succeeding cycle; and
adjusting an engine actuator based on the adjusted air charge estimate.

7. The method of claim 6, wherein valves of the first and second cylinders operate with positive valve overlap at top-dead-center of the end of exhaust, wherein the adjusting includes increasing cylinder air charge by the first amount for the first cylinder with a relatively lower exhaust pressure and increased scavenging.

8. The method of claim 7, wherein valves of the first and second cylinders operate with positive valve overlap at top-dead-center of the end of exhaust, wherein the adjusting includes increasing cylinder air charge by the second amount, larger than the first amount for the first cylinder with a relatively higher intake manifold pressure.

9. The method of claim 6, wherein, for each cylinder of the engine cycle, an adjustment to its cylinder air charge is made based on firing or non-firing of the immediately subsequent cylinder in the firing order both in the immediately preceding engine cycle and in the current engine cycle.

10. The method of claim 9, wherein cylinders not firing continue to have intake and exhaust valves operating.

11. A method for an engine, comprising:
adjusting an air charge estimate for a first cylinder by a first amount responsive to a second cylinder not firing during a current cycle and a previous cycle;
adjusting the air charge estimate by a second amount responsive to the second cylinder firing during the current cycle and not firing during the previous cycle;

adjusting the air charge estimate by a third amount responsive to the second cylinder not firing in the current cycle and firing during the previous cycle; and adjusting fuel injection amounts based on the adjusted air charge estimate.

12. The method of claim 11, further comprising adjusting an engine operating parameter based on the adjusted air charge estimate, wherein the current cycle is a current engine cycle including each cylinder of the engine completing its own cylinder cycle having four strokes, and wherein the previous cycle is a previous engine cycle.

13. The method of claim 11, wherein the second cylinder is an immediately scheduled cylinder following the first cylinder in an engine cycle firing order.

14. The method of claim 13, wherein an engine cycle firing order is the same during both the current cycle and the previous cycle.

15. The method of claim 14, wherein engine fueling is by at least some direct fuel injection into engine cylinders.

16. The method of claim 15, wherein intake air of the engine is boosted by a turbocharger.

17. The method of claim 15, wherein cylinders not firing continue to have intake and exhaust valves operating.

18. The method of claim 17, further comprising adjusting spark timing for each respective cylinder based on its adjusted air charge estimate.

19. The method of claim 18, wherein the air charge is estimated based on one or more of a manifold pressure sensor and a mass air flow sensor during engine operation while the engine is driving wheels of a vehicle along a ground.

20. The method of claim 19, wherein fuel injection to the first cylinder is adjusted directly based on the adjusted cylinder air charge estimate.

* * * * *